(12) United States Patent
Borlick et al.

(10) Patent No.: US 10,656,848 B2
(45) Date of Patent: May 19, 2020

(54) DATA LOSS AVOIDANCE IN MULTI-SERVER STORAGE SYSTEMS

(71) Applicant: International Business Machines Corporation, Armonk, NY (US)

(72) Inventors: Matthew G. Borlick, Tucson, AZ (US); Micah Robison, Tucson, AZ (US); John C. Elliott, Tucson, AZ (US); Kevin J. Ash, Tucson, AZ (US); Lokesh M. Gupta, Tucson, AZ (US); Brian A. Rinaldi, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/010,462

(22) Filed: Jun. 17, 2018

(65) Prior Publication Data
US 2019/0384509 A1    Dec. 19, 2019

(51) Int. Cl.
*G06F 3/06* (2006.01)

(52) U.S. Cl.
CPC ............ *G06F 3/0619* (2013.01); *G06F 3/065* (2013.01); *G06F 3/0631* (2013.01); *G06F 3/0659* (2013.01); *G06F 3/0673* (2013.01)

(58) Field of Classification Search
CPC ...... G06F 3/0619; G06F 3/0631; G06F 3/065; G06F 3/0659; G06F 3/0673
See application file for complete search history.

(56) References Cited

U.S. PATENT DOCUMENTS

| 7,839,123 | B1 | 11/2010 | Kilbourne, II et al. | |
|---|---|---|---|---|
| 9,009,417 | B2 | 4/2015 | Okawa | |
| 2004/0078508 | A1 | 4/2004 | Rivard | |
| 2010/0202236 | A1 | 8/2010 | Kahler et al. | |
| 2011/0191535 | A1* | 8/2011 | Yuasa | G06F 12/08 711/113 |
| 2018/0059761 | A1* | 3/2018 | An | G06F 13/4068 |

FOREIGN PATENT DOCUMENTS

EP    2993587 B1    2/2017

OTHER PUBLICATIONS

Kateja et al., "Viyojit: Decoupling Battery and DRAM Capacities for Battery-Backed DRAM", Proceedings of the 44th Annual International Symposium on Computer Architecture, pp. 613-626, Jun. 2017, https://www.microsoft.com/en-us/research/wp-content/uploads/2017/03/ISCA17_Viyojit.pdf.

* cited by examiner

*Primary Examiner* — Aracelis Ruiz
(74) *Attorney, Agent, or Firm* — Nelson and Nelson; Daniel P. Nelson; Alexis V. Nelson

(57) ABSTRACT

A method for avoiding data loss in a storage system is disclosed. In one embodiment, such a method includes monitoring a degradation level associated with a battery. The battery provides backup power to a storage system in the event of a primary power outage. The storage system includes volatile storage media storing modified data to destage to more persistent storage media, such as an array of storage drives. In the event the degradation level crosses a designated threshold, the method automatically takes steps to alter a time period needed to completely copy the modified data off of the volatile storage media. A corresponding system and computer program product are also disclosed.

20 Claims, 5 Drawing Sheets

DATA LOSS AVOIDANCE IN MULTI-SERVER STORAGE SYSTEMS

BACKGROUND

Field of the Invention

This invention relates to systems and methods for avoiding data loss in storage systems.

Background of the Invention

In an enterprise storage system such as the IBM DS8000™ enterprise storage system, a pair of servers may be used to access data in one or more storage drives (e.g., hard-disk drives and/or solid-state drives). During normal operation (when both servers are operational), the servers may manage I/O to different logical subsystems (LSSs) within the enterprise storage system. For example, in certain configurations, a first server may handle I/O to even LSSs, while a second server may handle I/O to odd LSSs. These servers may provide redundancy and ensure that data is always available to connected hosts. When one server fails, the other server may pick up the I/O load of the failed server to ensure that I/O is able to continue between the hosts and the storage drives. This process may be referred to as a "failover."

Each server in the storage system may include one or more processors and memory. The memory may include volatile memory (e.g., RAM) as well as non-volatile memory (e.g., ROM, EPROM, EEPROM, flash memory, local hard drives, local solid state drives, etc.). The memory may include a cache, such as a DRAM cache. Whenever a host (e.g., an open system or mainframe server) performs a read operation, the server that performs the read may fetch data from the storage drives and save it to its cache in the event it is required again. If the data is requested again by a host, the server may fetch the data from the cache instead of fetching it from the storage drives, saving both time and resources. Similarly, when a host performs a write, the server that receives the write request may store the modified data in its cache, and destage the modified data to the storage drives at a later time. When modified data is stored in cache, the modified data may also be stored in non-volatile storage (NVS) of the opposite server so that the modified data can be recovered by the opposite server in the event the first server fails. In certain embodiments, the NVS is implemented as battery-backed volatile memory in the opposite server.

When a storage system such as the IBM DS8000™ enterprise storage system experiences a power outage, the modified data in the NVS may be quickly copied (also referred to as performing a "fire hose dump") under battery power to more persistent storage on the server (e.g., a local disk drive, solid state drive, and/or flash drive on the server). The power in the backup battery needs to be sufficient to complete the copy process. If a battery is going bad, degraded, not maintained or replaced on schedule, or the like, the battery may not have sufficient energy to complete the copy process. In such cases, data loss may result.

In view of the foregoing, what are needed are systems and methods to ensure that modified data in an NVS is not lost in the event of a primary power outage. Further needed are systems and methods to ensure that, in the event of such a power outage, enough battery power is available to copy data from the NVS to more persistent storage.

SUMMARY

The invention has been developed in response to the present state of the art and, in particular, in response to the problems and needs in the art that have not yet been fully solved by currently available systems and methods. Accordingly, systems and methods have been developed to avoid data loss in a storage system. The features and advantages of the invention will become more fully apparent from the following description and appended claims, or may be learned by practice of the invention as set forth hereinafter.

Consistent with the foregoing, a method for avoiding data loss in a storage system is disclosed. In one embodiment, such a method includes monitoring a degradation level associated with a battery. The battery provides backup power to a storage system in the event of a primary power outage. The storage system includes volatile storage media storing modified data to destage to more persistent storage media, such as an array of storage drives. In the event the degradation level crosses a designated threshold, the method automatically takes steps to alter a time period needed to completely copy the modified data off of the volatile storage media.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
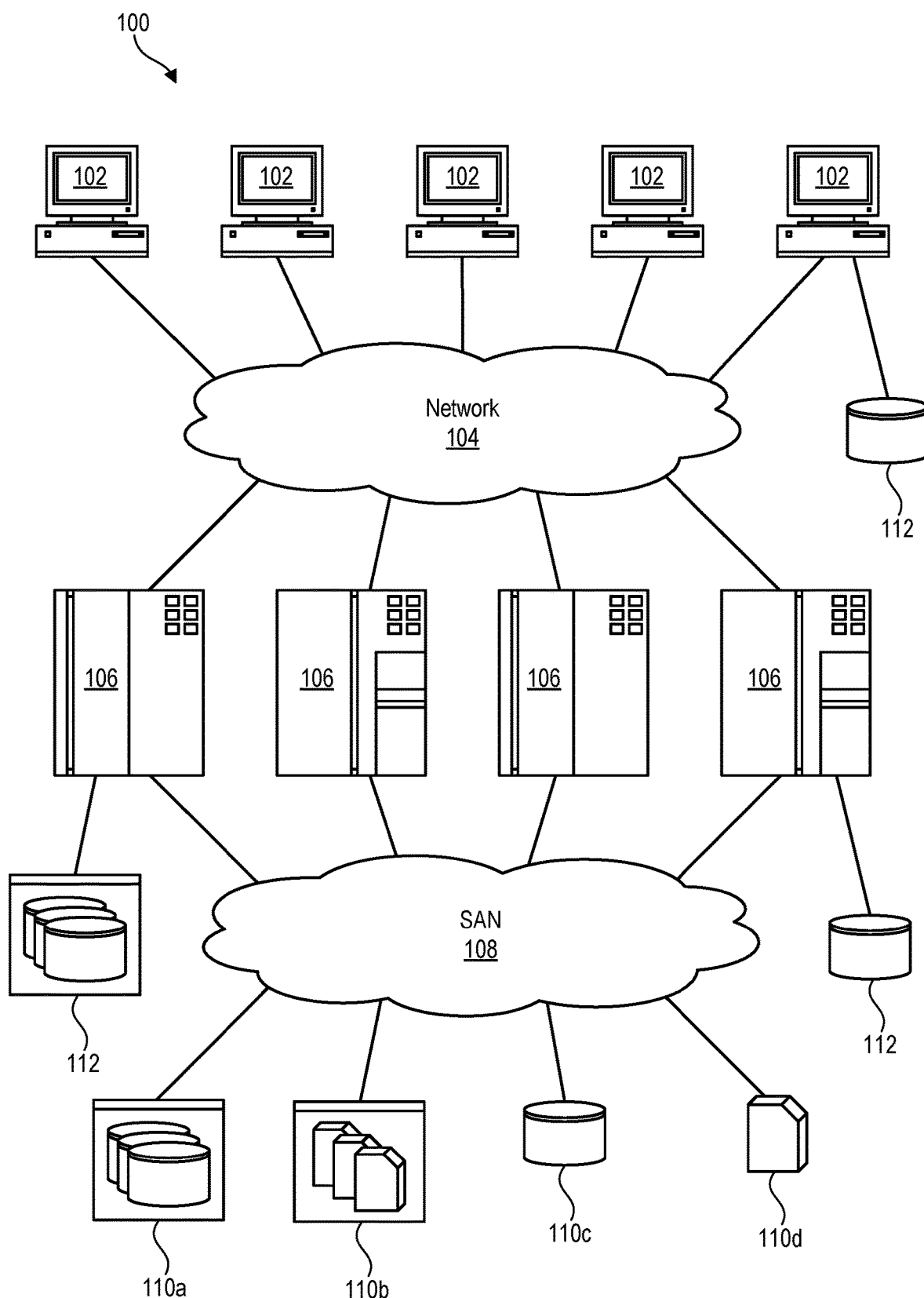
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
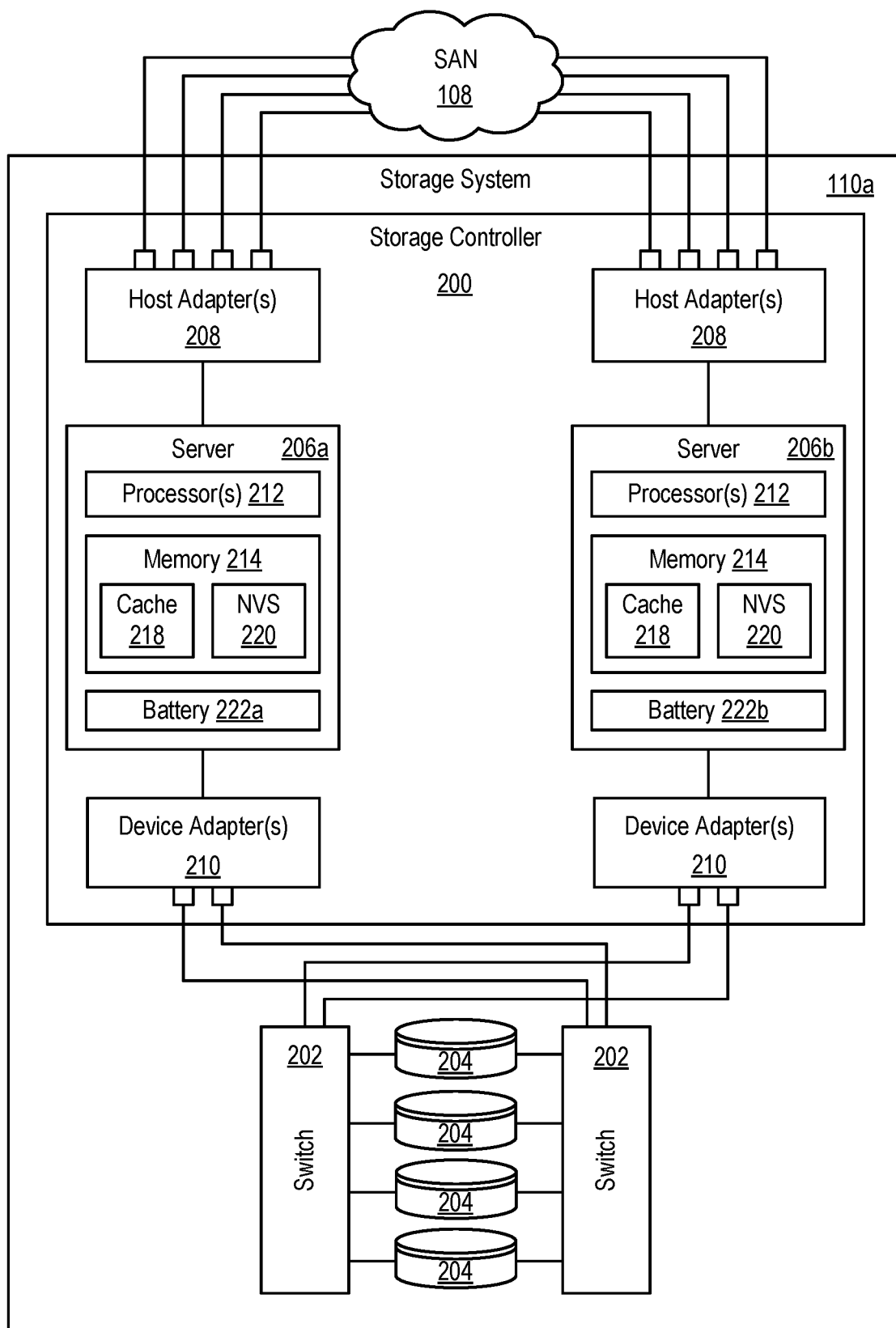
FIG. 2 is a high-level block diagram showing one example of a storage system for use in the network environment of FIG. 1.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204. The storage drives 204 may, in certain embodiments, be configured in RAID arrays of various RAID levels to provide desired levels of I/O performance and/or data redundancy.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 include one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed volatile memory in the opposite server 206. As shown in FIG. 2, each server 206a, 206b may include a battery 222a, 222b to provide backup power to the respective server 206a, 206b in the event primary power is interrupted.

When a storage system 110a such as that illustrated in FIG. 2 experiences a power outage, the modified data in the NVS 220 may be quickly copied (also referred to as performing a "fire hose dump") under battery power to more persistent storage (a local disk drive, solid state drive, flash drive, etc. in the server 206). The power in the battery 222 needs to be sufficient to complete this copy process. If a battery 222 is going bad, is degraded, or is not maintained or replaced on schedule, the battery 222 may not store the energy necessary to complete the copy process. In such cases, modified data in the NVS 220 may be all or partically lost.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
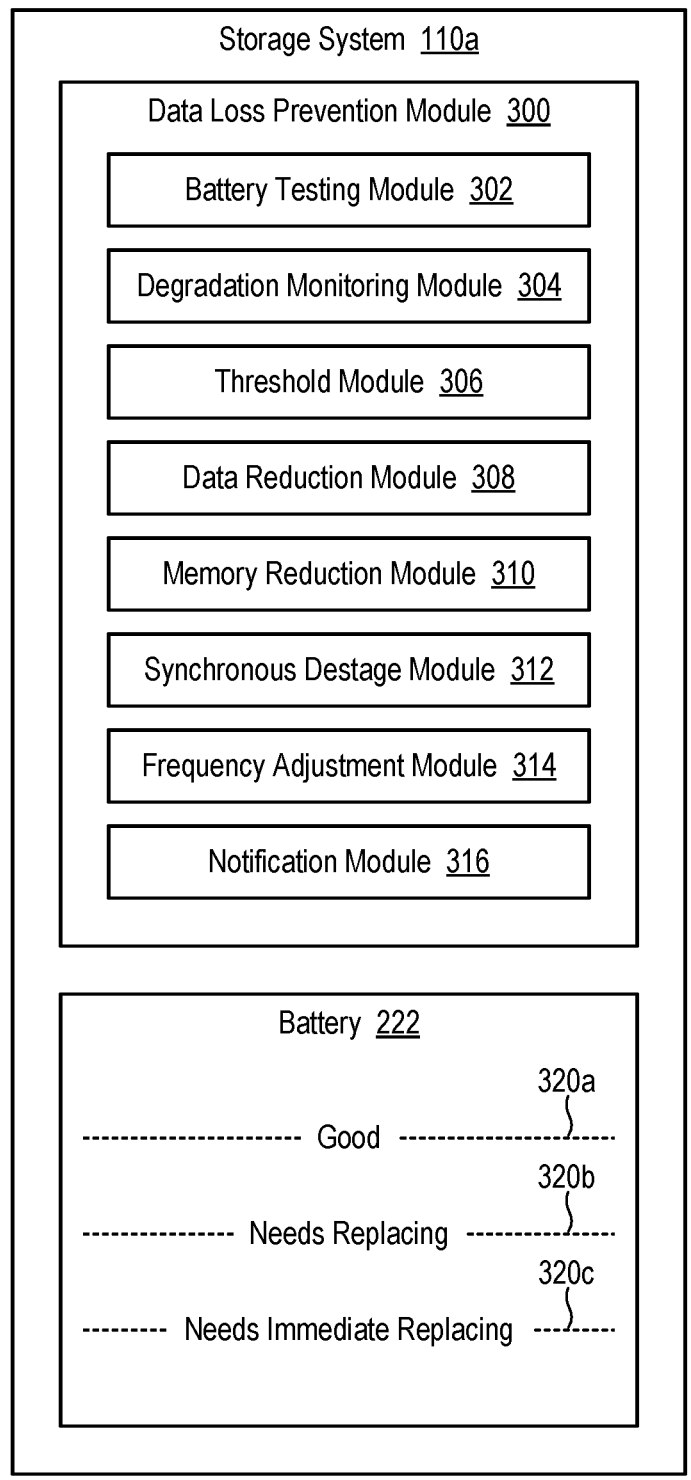
FIG. 3 is a high-level block diagram showing various modules that may be used to implement features and functions of the invention.

Referring to FIG. 3, in certain embodiments in accordance with the invention, a data loss prevention module 300 may be provided in the storage system 110a to prevent data loss in the event one or more of the batteries 222 in the storage system 110a are bad or degraded. In general, the data loss prevention module 300 may ensure that a battery 222 contains enough energy to fully copy all modified data off of an NVS 220 in the event the storage system 110a experiences a primary power outage. This may be accomplished in various ways and using various techniques, the likes of which be described in more detail hereafter.

The data loss prevention module 300 may be implemented in software, hardware, firmware, or a combination thereof. The data loss prevention module 300 may include various sub-modules 302-316 to perform various features and functions. For example, as shown, the data loss prevention module 300 may include one or more of a battery testing module 302, degradation monitoring module 304, threshold module 306, data reduction module 308, memory reduction module 310, synchronous destage module 312, frequency adjustment module 314, and notification module 316. These sub-modules are provided by way of example and not limitation. More or fewer sub-modules may be provided in different embodiments. For example, the functionality of some sub-modules may, in certain embodiments, be combined into a single or smaller number of sub-modules, or the functionality of a single sub-module may be distributed across several sub-modules. Other sub-modules may be omitted entirely.

The battery testing module 302 may be configured to periodically test the batteries 222 in the storage system 110a. The battery testing module 302 may use any known testing method or technique, such as testing the voltage, resistance, current, charge/discharge cycle, or the like, of the batteries 222. In certain embodiments, the testing occurs at specific predetermined time intervals. Alternatively, or additionally, the testing may occur on demand in response to a request from a user or computing system.

Using the test results from the battery testing module 302, the degradation monitoring module 304 may determine a level of degradation of the battery 222. In certain embodiments, the degradation level may be measured in terms of the amount of charge or usable energy the battery 222 is able to store. As can be appreciated by those of skill in the art, as a battery 222 ages or is utilized, the battery 222 may lose capacity to store and provide energy or charge. This may result in decreased capacity to provide power to storage system components such as the servers 206a, 206b. This may also reduce the amount of time the batteries 222 can provide backup power to the storage system 110a in the event of a primary power outage. In certain embodiments, the degradation level may be expressed as a percentage of the amount of charge a battery 222 can store when new. For example, a degradation level of ninety percent may indicate that the battery 222 is only able to store ninety percent of the energy/charge that the battery 222 could store when new. Similarly, a degradation level of fifty percent may indicate that the battery 222 is only able to store fifty percent of the energy/charge that the battery 222 could store when new. Other methods for representing and expressing the degradation level are possible and within the scope of the invention.

The threshold module 306 may be configured to determine when the degradation level of a battery 222 crosses one or more thresholds. The thresholds may correspond to certain degradation levels of the battery 222. For example, the threshold module 306 may detect when the degradation level falls below ninety percent or some other percentage.

In certain embodiments, the threshold module 306 may be configured to detect crossing of multiple thresholds. For example, as shown in FIG. 3, in certain embodiments, multiple different thresholds 320 may be established for a battery 222. For example, a battery 222 may be considered "good" when the amount of charge it can store is above a high threshold 320a (e.g., 90 percent). Similarly, the battery 222 may be considered to "need replacing" when the amount of charge it can store is below the high threshold 320a but above a middle threshold 320b (e.g., seventy-five percent). Similarly the battery 222 may be considered to "need immediate replacing" when the amount of charge it can store is below the middle threshold 320b but above a low threshold 320c (e.g., fifty percent). The battery 222 may be considered "bad" when the amount of charge it can store is below the low threshold 320c. The thresholds 320 presented in FIG. 3 are presented by way of example and not limitation. Other numbers of thresholds and placements (e.g., percentages related to degradation level) are possible and within the scope of the invention.

When the energy storage capacity of a battery 222 degrades past a certain level, the data loss prevention module 300 may take certain steps to ensure that data can be transferred off of the NVS 220 after a primary power outage but before the battery 222 is depleted of power. The data reduction module 308, memory reduction module 310, synchronous destage module 312, and frequency adjustment module 314 may take different steps to ensure this can be accomplished.

For example, the data reduction module 308 may, in certain embodiments, reduce the amount of modified data in the NVS 220 that needs to be copied off to more persistent storage. This may be accomplished, for example, by beginning to copy modified data from the NVS 220 to local persistent storage media, such as local disk drives, solid state drives, flash drives, or the like, before a primary power outage has actually occurred. If a primary power outage does occur, less time would be required to copy the remainder of the data from the NVS 220 to the persistent storage media. In certain embodiments, the data reduction module 308 may copy modified data from the NVS 220 to a rolling buffer implemented within the persistent storage media. The rolling buffer may work on a first in, first out basis such that more recently copied data pushes out less recently copied data. This may help to reduce the amount of storage capacity that is utilized in the persistent storage media.

Be contrast, the memory reduction module 310 may reduce an amount of storage capacity in the NVS 220 in order to reduce how much modified data can be stored therein. In certain embodiments, this may be accomplished by destaging all modified data from the NVS 220 to the storage drives 204. The server 206 that hosts the NVS 220 may then pass ownership of its LSSs to the other server 206 in the storage system 110a such that the storage system 110a is running in single-server mode (i.e., a single server 206 is servicing all I/O requests received by the storage system 110a). The server 206 that hosts the NVS 220 may then be powered down and powered back up with the newly configured NVS 220 size. As a result, a smaller amount of memory 214 in the server 206 may be dedicated to implementing the NVS 220. Upon powering up, the server 206 that hosts the NVS 220 may retake ownership of the LSSs that were previously transferred to the other server 206, thereby allowing the storage system 110a to once again run in two-server mode. Because resizing the NVS 220 may require significant overhead and reduce I/O performance of the storage system 110a, the memory reduction module 310 may ideally resize the NVS 220 on an infrequent basis.

The synchronous destage module 312 may cause modified data written to the NVS 220 to be synchronously destaged to the storage drives 204. In this mode, data is written to the NVS 220 and destaged to the storage drives 204 simultaneously, preventing any interim time period when data is exclusively in the NVS 220. Although this may significantly impact I/O performance, since it may require data to be destaged to slower storage drives 204 before a write request is considered complete, it may provide assurances that any data stored in the NVS 220 will not be lost. Because of the impacts on I/O performance, this measure may, in certain embodiments, only be taken as a last resort.

In certain embodiments, certain operations may be executed on a storage system 110a that completely destage all modified data in an NVS 220 to the storage drives 204. For example, in the IBM DS8000™ enterprise storage system, a "Safe Data" commit operation may be executed periodically (e.g., every hour) that completely destages all data in the NVS 220 to the storage drives 204. This operation provides assurance that, if data loss does occur, it only involves modified data written since the last "Safe Data" commit operation. The frequency adjustment module 314 may be used to adjust the frequency of this operation. For example, in the event a battery 222 has degraded a significant amount, the frequency adjustment module 314 may increase the frequency that the destage operation is performed, such as from once every hour to once every five minutes. This will reduce the amount of exposure to data loss.

Figure 4:
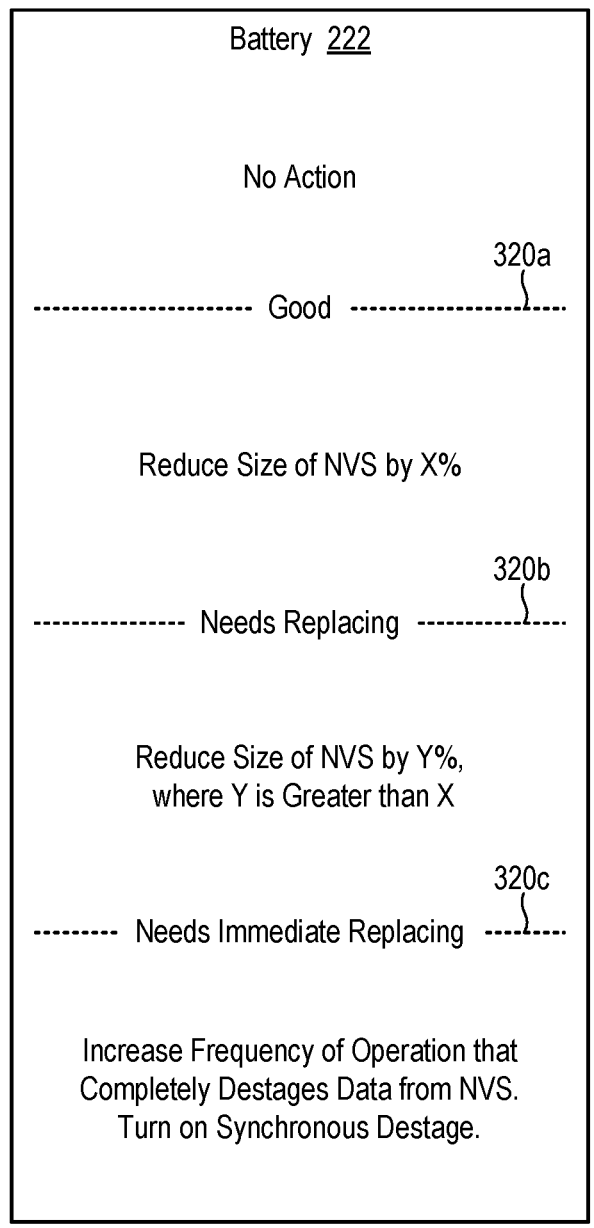
FIG. 4 is a block diagram showing various thresholds and corresponding actions that may be taken for different battery degradation levels.

FIG. 4 shows various exemplary thresholds 320 that may be established for a battery 222, as well as actions that may be taken in relation to the thresholds 320. These thresholds 320 and actions are simply examples and are not intended to limit the invention. As shown in FIG. 4, when the degradation level for a battery 222 is above the high threshold 320a, the data loss prevention module 300 may take no action. When the degradation level of the battery 222 is between the middle threshold 320b and the high threshold 320a, the data loss prevention module 300 may reduce the size of the NVS 220 by some percentage X (e.g., fifty percent) of the original size of the NVS 220. Similarly, when the degradation level of the battery 222 is between the low threshold 320c and the middle threshold 320b, the data loss prevention module 300 may reduce the size of the NVS 220 to some percentage Y (e.g., twenty-five percent) of the original size of the NVS 220, where Y is less than X. If the battery degradation level is below the low threshold 320c, the battery 222 may be considered "bad" and the data loss prevention module 300 may increase the frequency of an operation that completely destages data from the NVS 220 to the storage drives 204 (e.g., from once every hour to once every five minutes, for example). The data loss prevention module 300 may also turn on synchronous destage mode which may cause writes to the NVS 220 to be synchronously destaged to the storage drives 204.

Figure 5:
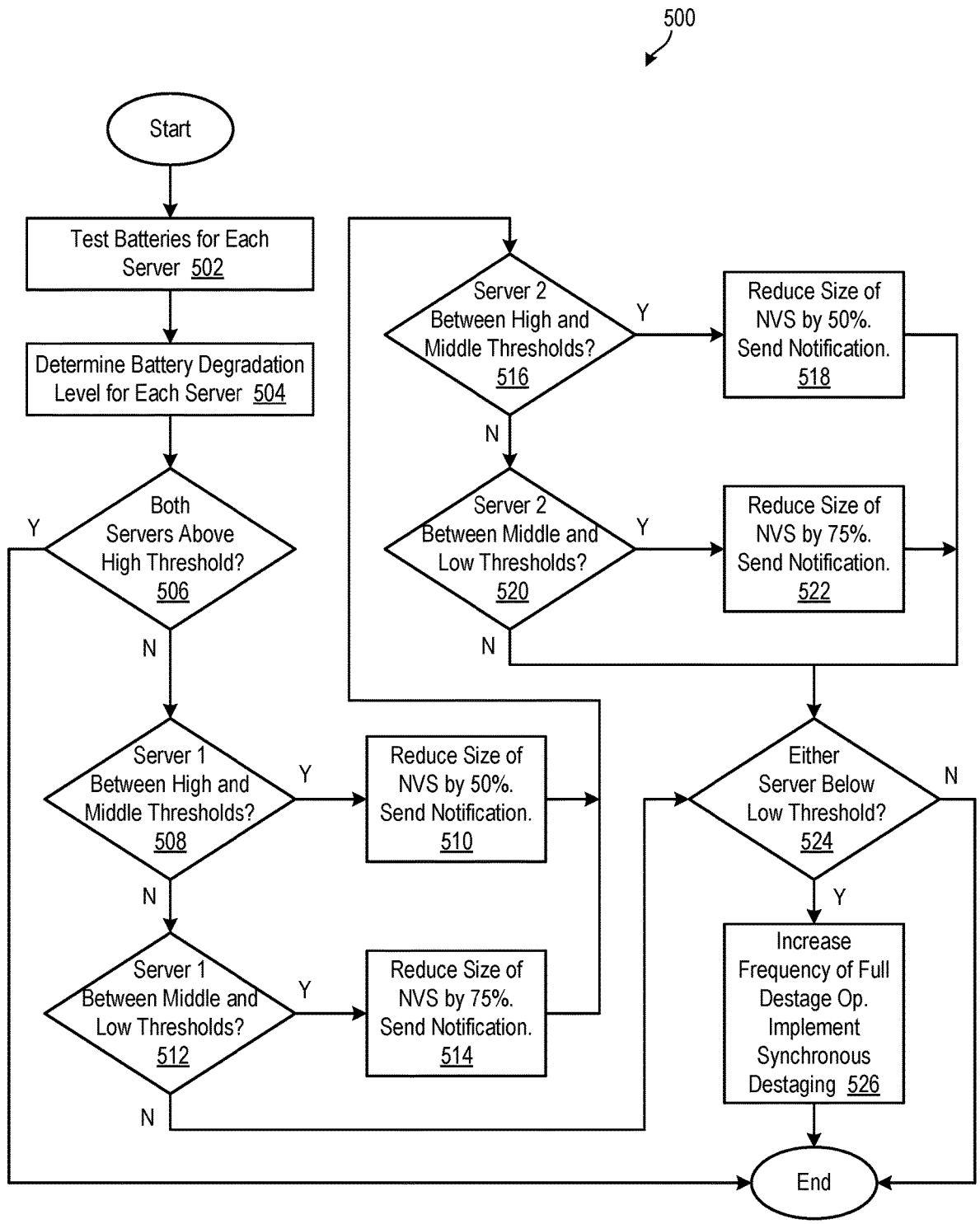
FIG. 5 is a process flow diagram showing an exemplary method for avoiding data loss in a storage system using the thresholds and actions of FIG. 4.

Referring to FIG. 5, one embodiment of a method 500 for avoiding data loss in a storage system such as that illustrated in FIG. 2 is illustrated. Such a method 500 may be periodically executed by the data loss prevention module 300 previously described. As shown, the method 500 periodically tests 502 the batteries 222 of each server 206 in the storage system 110a. The method 500 further determines 504, using the test results, the battery degradation levels for each server 206. If, at step 506, the battery degradation levels for both servers 206 are above the high threshold 320a, the method 500 may take no action and the method 500 may end. If, at step 508, the battery degradation level of the first server 206a is between the high threshold 320a and the middle threshold 320b, the method 500 reduces 510 the size of the NVS 220 for the first server 206a by fifty percent and sends a notification (to a hardware management console associated with the storage system 110a, for example) indicating that the battery 222a needs replacing. If, at step 512, the battery degradation level of the first server 206a is between the middle threshold 320b and the low threshold 320c, the method 500 reduces 512 the size of the NVS 220 by seventy-five percent and sends a notification indicating that the battery 222a needs immediate replacing.

The method 500 may then take various actions based on the battery degradation levels of the second server 206b. For example, if, at step 516, the battery degradation level of the second server 206b is between the high threshold 320a and the middle threshold 320b, the method 500 reduces 518 the size of the NVS 220 by fifty percent and sends a notification indicating that the battery 222b needs replacing. If, at step 520, the battery degradation level of the second server 206b is between the low threshold 320c and the middle threshold 320b, the method 500 reduces 522 the size of the NVS 220 by seventy-five percent and sends a notification indicating that the battery 222b needs immediate replacing.

If, at step 524, the method 500 determines that either server 206a, 206b is below the low threshold 320c, the method 500 increases 526 the frequency that the full destage operation is performed for each server 206, and turns on 526 synchronous destaging for the storage system 110a. In the event the degraded batteries 222 in the storage system 110a are replaced, any or all of the configuration changes made by the method 500 may be reversed and the storage system 110a may be returned to normal operation.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for avoiding data loss in a storage system, the method comprising:
    monitoring a degradation level associated with a battery, the battery providing backup power to a storage system in the event of a primary power outage, the storage system comprising a first server and a second server, the first server comprising a volatile storage media storing modified data to destage to persistent storage media;
    in the event the degradation level crosses a designated threshold, performing the following:
        destaging the modified data from the volatile storage media to the persistent storage media;
        passing, from the first server to the second server, ownership of logical subsystems normally serviced by the first server;
        modifying a size of the volatile storage media and restarting the first server; and
        retaking, by the first server, ownership of the logical subsystems.

2. The method of claim 1, further comprising, in the event the degradation level crosses the designated threshold, reducing an amount of the modified data in the volatile storage media.

3. The method of claim 1, further comprising, in the event the degradation level crosses the designated threshold, causing the storage system to temporarily operate in single-server mode.

4. The method of claim 1, further comprising, in the event the degradation level crosses the designated threshold, synchronously destaging, to the persistent storage media, modified data written to the volatile storage media.

5. The method of claim 1, further comprising, in the event the degradation level crosses the designated threshold, modifying a frequency wherein all modified data in the volatile storage media is completely destaged to the persistent storage media.

6. The method of claim 1, wherein the degradation level is associated with an amount of usable energy the battery is able store.

7. The method of claim 1, wherein retaking ownership of the logical subsystems comprises causing the storage system to transition from one-server mode to two-server mode.

8. A computer program product for avoiding data loss in a storage system, the computer program product comprising a computer-readable storage medium having computer-usable program code embodied therein, the computer-usable program code configured to perform the following when executed by at least one processor:
monitor a degradation level associated with a battery, the battery providing backup power to a storage system in the event of a primary power outage, the storage system comprising a first server and a second server, the first server comprising a volatile storage media storing modified data to destage to persistent storage media;
in the event the degradation level crosses a designated threshold, perform the following:
destage the modified data from the volatile storage media to the persistent storage media;
pass, from the first server to the second server, ownership of logical subsystems normally serviced by the first server;
modify a size of the volatile storage media and restart the first server; and
retake, by the first server, ownership of the logical subsystems.

9. The computer program product of claim 8, wherein the computer-usable program code is further configured to, in the event the degradation level crosses the designated threshold, reduce an amount of the modified data in the volatile storage media.

10. The computer program product of claim 8, wherein the computer-usable program code is further configured to, in the event the degradation level crosses the designated threshold, cause the storage system to temporarily operate in single-server mode.

11. The computer program product of claim 8, wherein the computer-usable program code is further configured to, in the event the degradation level crosses the designated threshold, synchronously destage, to the persistent storage media, modified data written to the volatile storage media.

12. The computer program product of claim 8, wherein the computer-usable program code is further configured to, in the event the degradation level crosses the designated threshold, modify a frequency wherein all modified data in the volatile storage media is completely destaged to the persistent storage media.

13. The computer program product of claim 8, wherein the degradation level is associated with an amount of usable energy the battery is able store.

14. The computer program product of claim 8, wherein retaking ownership of the logical subsystems comprises causing the storage system to transition from one-server mode to two-server mode.

15. A system for avoiding data loss in a storage system, the system comprising:
at least one processor;
at least one memory device operably coupled to the at least one processor and storing instructions for execution on the at least one processor, the instructions causing the at least one processor to:
monitor a degradation level associated with a battery, the battery providing backup power to a storage system in the event of a primary power outage, the storage system comprising a first server and a second server, the first server comprising a volatile storage media storing modified data to destage to persistent storage media;
in the event the degradation level crosses a designated threshold, perform the following:
destage the modified data from the volatile storage media to the persistent storage media;
pass, from the first server to the second server, ownership of logical subsystems normally serviced by the first server;
modify a size of the volatile storage media and restart the first server; and
retake, by the first server, ownership of the logical subsystems.

16. The system of claim 15, wherein the instructions further cause the at least one processor to, in the event the degradation level crosses the designated threshold, reduce an amount of the modified data in the volatile storage media.

17. The system of claim 15, wherein the instructions further cause the at least one processor to, in the event the degradation level crosses the designated threshold, cause the storage system to temporarily operate in single-server mode.

18. The system of claim 15, wherein the instructions further cause the at least one processor to, in the event the degradation level crosses the designated threshold, synchronously destage, to the persistent storage media, modified data written to the volatile storage media.

19. The system of claim 15, wherein the instructions further cause the at least one processor to, in the event the degradation level crosses the designated threshold, modify a frequency wherein all modified data in the volatile storage media is completely destaged to the persistent storage media.

20. The system of claim 15, wherein the degradation level is associated with an amount of usable energy the battery is able store.

* * * * *